(No Model.)
A. B. MOORE.
FASTENING FOR METAL LATHS.
No. 313,228. Patented Mar. 3, 1885.
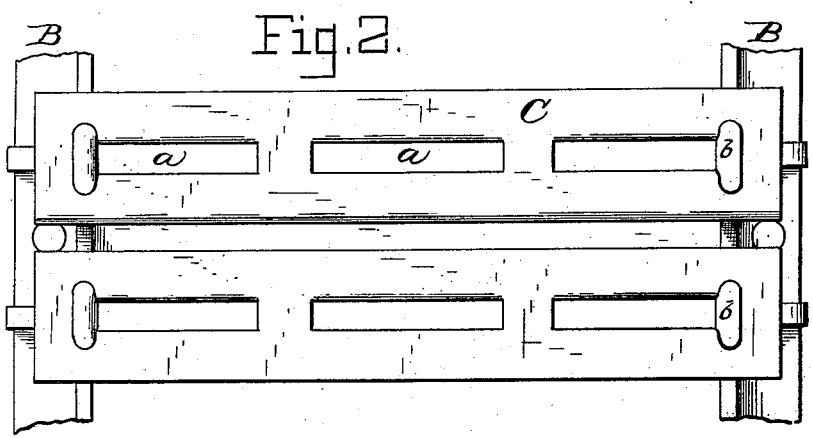
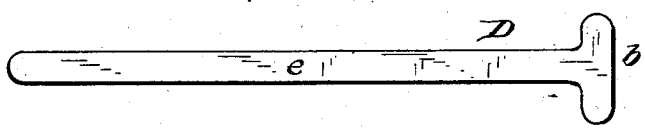
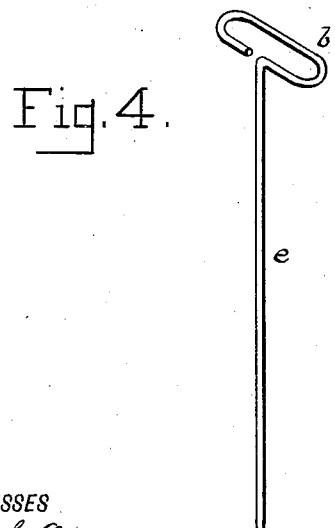
WITNESSES
Franck L. Durand
H. B. Applewhaite
INVENTOR
Aaron B. Moore
Per
A. H. Evans, Attorneys

UNITED STATES PATENT OFFICE.

AARON B. MOORE, OF MOUNT VERNON, OHIO, ASSIGNOR TO THE COOPER MANUFACTURING COMPANY, OF SAME PLACE.

FASTENING FOR METAL LATHS.

SPECIFICATION forming part of Letters Patent No. 313,228, dated March 3, 1885.

Application filed February 10, 1882. (No model.)

*To all whom it may concern:*

Be it known that I, AARON B. MOORE, of Mount Vernon, Knox county, Ohio, have invented a new and Improved Fastening for Metal Laths; and I hereby declare the following to be a full, clear, and exact description thereof, reference being had to the accompanying drawings, making part of this specification, in which—

Figure 1 is a cross-sectional view of my improved fastener applied. Fig. 2 is a plan view of the same. Fig. 3 is a plan of the blank from which the fastener is made. Fig. 4 is a modification of the same.

The object of my invention is to provide a fastening for metal lathing which shall be cheap in construction and be applied with great rapidity and ease.

My invention consists of a fastener made from a blank of sheet metal having a head broader than the slot in the sheet-metal lath, and provided with a shank which is passed through said slot around the angle-iron or furring-strips, and is clinched on the outer face of the side of the angle-iron contiguous to the wall, all of which will be hereinafter fully described and claimed.

In order that those skilled in the art may make and use my invention, I will proceed to describe the manner in which I have carried it out.

In the said drawings, A are stringers against the walls, to which are secured the angle-iron or furring-strips B B. The sheet-metal laths C are made after any desired pattern having the central longitudinal slots, or any form of slots $a$ $a$.

The fastenings are first produced from a blank, D, Fig. 3, cut, preferably, of sheet metal in the form shown. The head portion $b$ is of such dimension at right angles to the shank as to have its length greater than the width of slots $a$. After these blanks are struck or punched the head portion $b$ is bent over, as seen at D', Fig. 1, so that the head portion lies in a plane at right angles to the shank $e$.

In applying the fastener the end of the shank is passed through the slot $a$ at its end, and thence beneath the furring-strip B, and up over the face of the side of the angle-iron contiguous to the wall, where it is clinched.

The modification of my device shown in Fig. 4 is made of wire with a head looped and bent in the same manner as the sheet-metal blank.

Having thus described my invention, what I claim as new, and desire to secure by Letters Patent, is—

The fastening for sheet-metal laths consisting of the shank $e$ and head $b$, the head $b$ being bent at right angles to the plane of the shank, substantially as described.

AARON B. MOORE.

Witnesses:
R. K. EVANS,
H. B. APPLEWHAITE.